United States Patent
Barat Quesada et al.

(10) Patent No.: US 9,158,731 B2
(45) Date of Patent: Oct. 13, 2015

(54) MULTIPROCESSOR ARRANGEMENT HAVING SHARED MEMORY, AND A METHOD OF COMMUNICATION BETWEEN PROCESSORS IN A MULTIPROCESSOR ARRANGEMENT

(75) Inventors: Francisco Barat Quesada, Leuven (BE); Mark Janssens, Leuven (BE)

(73) Assignee: NXP, B. V., Eindhoven (NL)

( * ) Notice: Subject to any disclaimer, the term of this patent is extended or adjusted under 35 U.S.C. 154(b) by 263 days.

(21) Appl. No.: 13/410,611

(22) Filed: Mar. 2, 2012

(65) Prior Publication Data

US 2012/0226873 A1 Sep. 6, 2012

(30) Foreign Application Priority Data

Mar. 4, 2011 (EP) .................................. 11156930

(51) Int. Cl.
G06F 12/00 (2006.01)
G06F 15/167 (2006.01)
G06F 15/80 (2006.01)

(52) U.S. Cl.
CPC .......... *G06F 15/167* (2013.01); *G06F 15/8023* (2013.01)

(58) Field of Classification Search
CPC . G06F 12/084; G06F 12/0842; G06F 11/004; G06F 11/3055; G06F 9/526
See application file for complete search history.

(56) References Cited

U.S. PATENT DOCUMENTS

| | | | |
|---|---|---|---|
| 5,708,850 A * | 1/1998 | Staros | 710/48 |
| 6,993,637 B1 | 1/2006 | Kwong | |
| 7,548,982 B2 * | 6/2009 | Gu et al. | 709/228 |
| 7,565,563 B2 * | 7/2009 | Gappisch et al. | 713/401 |
| 7,716,332 B1 * | 5/2010 | Topfl et al. | 709/226 |
| 8,200,992 B2 * | 6/2012 | Felch et al. | 713/300 |
| 8,244,959 B2 * | 8/2012 | Fusella et al. | 711/103 |
| 8,341,501 B2 * | 12/2012 | Franceschini et al. | 714/774 |
| 8,504,411 B1 * | 8/2013 | Subasic et al. | 705/7.33 |
| 8,676,741 B2 * | 3/2014 | Ulinski et al. | 706/52 |
| 2004/0128618 A1 * | 7/2004 | Datta | 715/513 |
| 2008/0288863 A1 * | 11/2008 | Bohannon | 715/255 |
| 2011/0010503 A1 * | 1/2011 | Yamamura et al. | 711/128 |
| 2011/0145486 A1 * | 6/2011 | Owa et al. | 711/103 |
| 2011/0185126 A1 | 7/2011 | Sasaki et al. | |
| 2012/0047317 A1 * | 2/2012 | Yoon et al. | 711/103 |
| 2013/0086302 A1 * | 4/2013 | Tressler et al. | 711/103 |

OTHER PUBLICATIONS

Extended European Search Report for European Patent Appln. No. 11156930.7 (Jul. 11, 2011).

* cited by examiner

*Primary Examiner* — Tuan Thai
*Assistant Examiner* — Mohamed Gebril

(57) ABSTRACT

A multiprocessor arrangement is disclosed, in which a plurality of processors are able to communicate with each other by means of a plurality of time-sliced memory blocks. At least one, and up to all, of the processors may be able to access more than one time-sliced memories. A mesh arrangement of such processors and memories is disclosed, which may be a partial or complete mesh. The mesh may to two-dimensional, or higher dimensional.

A method of communication between processors in a multiprocessor arrangement is also disclosed, in which one or more processors are able to each access a plurality of memories, in each case by time-slicing.

15 Claims, 4 Drawing Sheets

MULTIPROCESSOR ARRANGEMENT HAVING SHARED MEMORY, AND A METHOD OF COMMUNICATION BETWEEN PROCESSORS IN A MULTIPROCESSOR ARRANGEMENT

CROSS-REFERENCE TO RELATED APPLICATIONS

This application claims the priority under 35 U.S.C. §119 of European patent application no. 11156930.7, filed on Mar. 4, 2011, the contents of which are incorporated by reference herein.

FIELD OF THE INVENTION

This invention relates to multiprocessor arrangements having shared memory, and to methods of communication between processors in such a multiprocessor arrangement.

BACKGROUND OF THE INVENTION

Multiprocessor arrangements typically require to have some means of communication between the individual processors. One known method to provide such communication is by means of shared memory. In order to transfer information from a first processor to a second processor, the first processor can write data to the shared memory, and the data be read by the second processor.

So-called "time-sliced" memory is a convenient method to provide such a shared memory. As will be familiar to those skilled in the art, and described in more detail hereinbelow, memory can in some cases operate with a faster clock cycle than can processors. Taking as an example a situation in which a memory clock can run three times the speed of each of three processors. Then, multiple accesses to the memory can be made during a single (processor) clock cycle. If the processor clock cycles—three in this instance—are staggered in time, access to the memory may be distributed in time between the three processors. Such a modified von Neuman architecture, which is commonly referred to as time-slicing, is known and used for instance in the DSP32C device supplied by Lucent Technologies.

Communication between processors in multiprocessor arrangements by time-slicing suffers from a disadvantage, in that the number of processors which can share information is limited—in the example above, for instance, at most 3 processors can be involved in the time slicing.

SUMMARY OF THE INVENTION

According to a first aspect, there is provided a multiprocessor arrangement for providing communication between a plurality of processors and comprising a plurality of processors, each operable with a processor clock rate, a first memory comprising a first group of memory blocks and operable with a first memory clock rate, and a second memory comprising a second group of memory blocks and operable with a second memory clock rate, wherein each of the first memory clock rate and the second memory clock rates are faster than the processor clock rate, each processor is able to access a one of the first group of memory blocks and to access a one of the second group of memory blocks, wherein the processors able to access each respective memory block of the first group of memory blocks are configured to be clocked to enable sequential access to that respective memory block, and the processors able to access each respective memory block of the second group of memory blocks are configured to be clocked to enable sequential access to that respective memory block. Such "multi-dimensional" time-slicing may provide for particularly efficient use of available power.

In embodiments, each of the processors able to access a one of the first group of memory blocks is able to access a different respective memory block of the second group of memory blocks. This provides for a particular efficient means of communication, wherein a relatively larger number of processors are able to directly communicate with each other.

In embodiments, the memory clock rate exceeds that of each processor by a factor which is at least equal to the number of processors associated with the one of the first group of memory blocks.

In embodiments, at least one of the first memory clock rate and the second memory clock rate is four times that of the processor clock rate. Embodiments wherein the clock rate multiple is matched to the number of processors accessing each memory provides for time-efficiency of memory access.

In embodiments, the first group of memory blocks and the second group of memory blocks comprise partitions of a single memory. Having a single memory provides for space, and power, efficiencies. The memory may also be considered as a memory cluster.

In embodiments, at least one processor of the first group of processors is also able to access a one of a third group of memory blocks. This may provide for processors to communicate with another group of processors via the third group of memory blocks. The third group of memory blocks may enable communication, by means of an intermediate processor, with another group of processors which may be able to access the one of a third group of memory blocks.

According to another aspect, there is provided a method of communication between processors in a multiprocessor arrangement which comprises a first group of memory blocks and a second group of memory blocks, comprising: providing access for a first plurality of processors to a one memory block of the first group of memory blocks by time-slicing; providing access for a second plurality of processors to a one memory block of the second group of memory blocks by time-slicing; wherein the first plurality of processors has at least one processor in common with the second plurality of processors and at least one processor not in common with the second plurality of processors.

In embodiments, the method further comprises a first one of the first plurality of processors writing data to the one memory block of the first group of memory blocks, and a second one of the first plurality of processors reading the data from the one memory block of the first group of memory blocks.

In embodiments, the first processor comprises a routing table for storing information indicative of which memory block of either the first or the second group of memory blocks is accessible by a specific second processor.

In embodiments, the method further comprises a first one of the second plurality of processors writing data to the one memory block of the second group of memory blocks, and a second one of the second plurality of processors reading the data from the one memory block of the first second of memory blocks, wherein the first one of the first plurality of processors is also the first one of the second plurality of processors.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
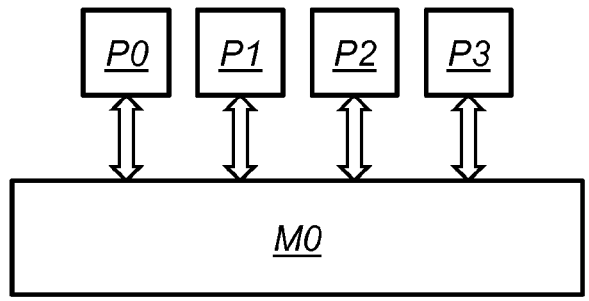
FIG. 1 illustrates a group of processors accessing a single memory block.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

In multiprocessor arrangements, it will generally be necessary to provide some means of communication between the processors. Several means are known to provide this, including using a shared memory, in which a single memory is accessible by different processors through different ports; point-to-point connections, in which customer connections are made between processors; and network-on-chip solutions, have custom hardware for data transfer between processors.

One interesting way to implement a limited scale multiprocessor system is based on memory time-slicing. Memory time-slicing may be achieved as follows: the minimum voltage required for proper operation is generally higher for memories than for logic circuits. Thus, when operating at low voltages, a memory can operate significantly faster—typically up to several times faster—than a logic since the voltage of the memory is actually higher than the voltage of the logic. Thus a memory clock cycle can be several times shorter than a processor, or logic, clock. This enables the memory to be accessed several times during a single logic clock cycle. By suitably staggering the clocks of several logic processors, each can access the memory through the same port, thereby avoiding the overhead, in both power and space, of the several ports which would otherwise be required.

Figure 2:
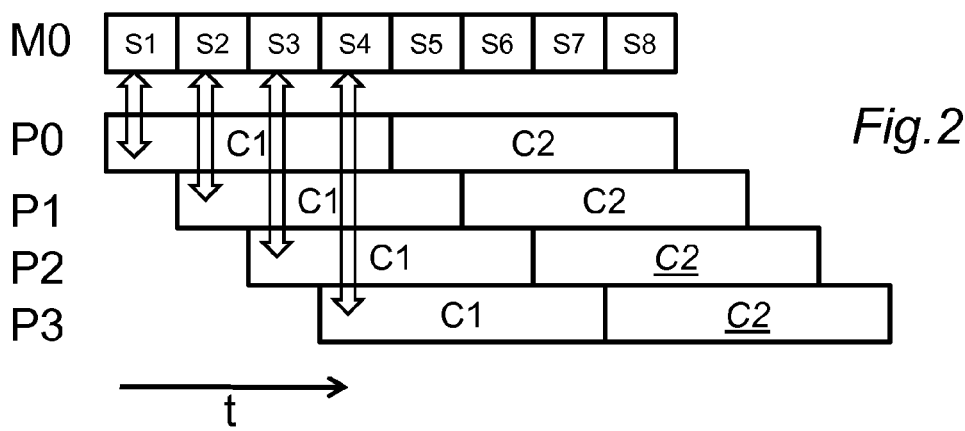
FIG. 2 is a timing diagram for a group of processors accessing a single memory block.
Figure 3:
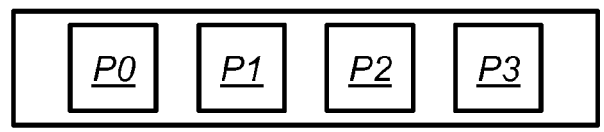
FIG. 3 is a diagrammatic representation of a group of processors which can access a single memory block.

Such a time-sliced arrangement, for instance as implemented by NXP Semiconductors in their "CoolFlux"® technology, is shown schematically in FIGS. 1-3. In FIG. 1, it is shown that several processors, P0...P3 can access (either one or both of read and write) respectively to or from memory M0.

FIG. 2 is a timing diagram, over time t, for a group of processors accessing a single memory block. Each of, in the example shown 4, processors P0...P3 has successive clock cycles C1 and C2; the clock cycles are staggered relative to each other, such that processor P0 is able to access the time-sliced memory M0 during a first memory clock cycle S1, and again during a fifth memory clock cycle S5; similarly, processor P1 is able to access the time-sliced memory M0 during a first memory clock cycle S2, and again during a fifth memory clock cycle S6, and processor P2 is able to access the time-sliced memory M0 during a first memory clock cycle S3, and again during a fifth memory clock cycle S7; finally, processor P3 is able to access the time-sliced memory M0 during a first memory clock cycle S4, and again during a fifth memory clock cycle S8. FIG. 3 is a diagrammatic representation of a group of processors which can access a single memory block, as described above with reference to FIGS. 1 and 2.

This arrangement suffers from a limitation in that the number of processors which can access a memory through a single port is limited. In particular, the limit corresponds to the ratio of the speed with which the memory can be accessed, that is to say the clock frequency of the memory, to the processor speed, that is to say the processor frequency. The scaleability of this solution is thus limited.

Figure 4:
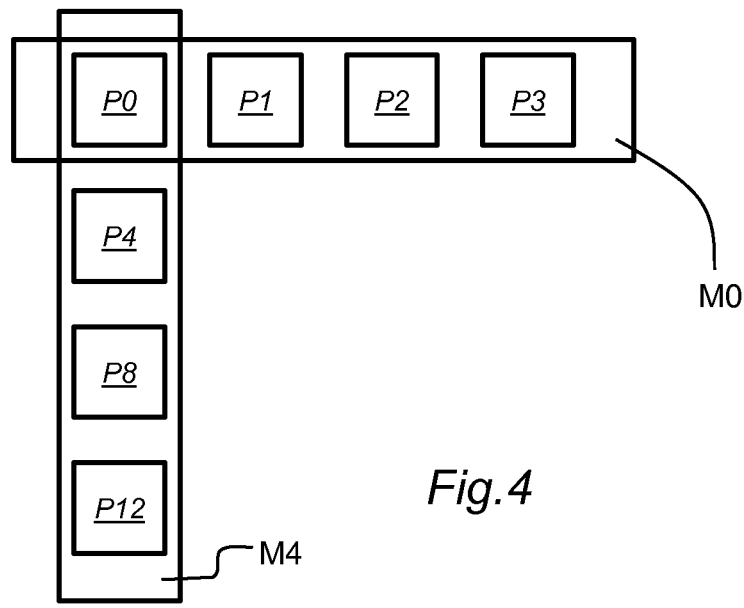
FIG. 4 is a diagrammatic representation of a first grouping of processors, which can access a first memory block, an a second grouping processors which can access a second memory block, there being an overlap between the first and second groupings.

FIG. 4 is a diagrammatic representation of a first grouping of processors, which can access a first memory block, and a second grouping of processors which can access a second memory block, there being an overlap between the first and second groupings. In this embodiment, the limitation of the above arrangement is relaxed: similarly to that described above, a plurality of processors, P0...P3, which in this case is four in number, are associated with and are able to access a single shared memory block M0. However, another plurality of processors, P0, P4 P8 and P12, which in this case is also four in number, are associated with and are able to access a different single shared memory M4. In the example shown, one processor, P0, is able to access both memory block M0 and memory block M4. Processor P0 thereby overcomes the previous limitation—that of being able to communicate with only 3 other processors, and can now communicate directly with a large number of processors—6 in the example shown. Moreover, the remaining processors P1, P2, P3, and P4, P8 and P12, can each communicate with each other, albeit only indirectly: for example, for processor P3 to communicate data to processor P4, it writes the data to M0; processor P0 then reads to data from M0 and writes the data to M4; finally processor P4 reads the data from M4. It will be immediately apparent to the skilled person, that the arrangement may be configured so that more processor may overlap, that is to say, be able to access both memory M0 and M4.

Figure 5:
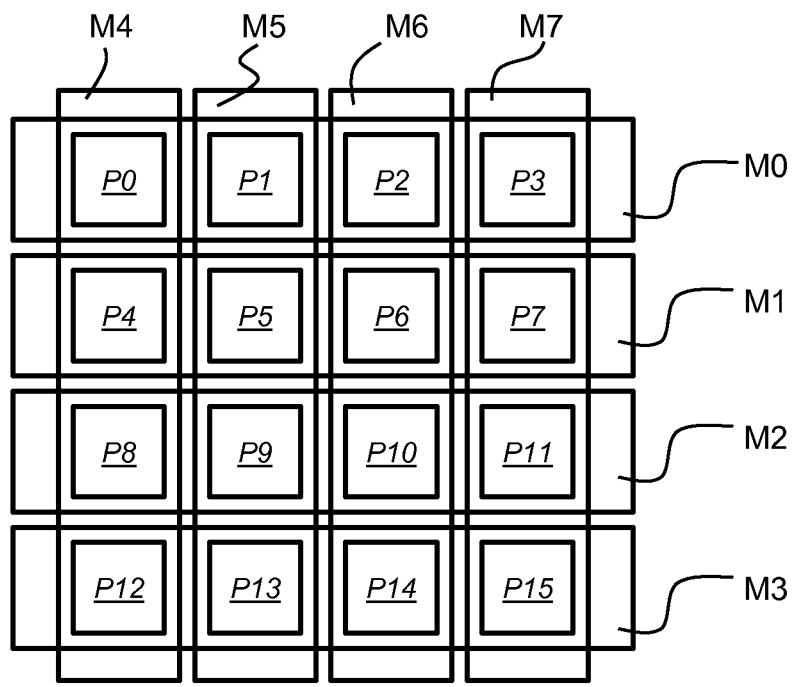
FIG. 5 is a diagrammatic representation of the groups of processors of FIG. 5 grouped two ways, each group of the first grouping able to access a different memory block of a first group of memory blocks and each group of the second grouping able to access a different memory block of a second group of memory blocks

FIG. 5 is a diagrammatic representation of other embodiments, in which of the groups of processors of FIG. 5 grouped two ways, each group of the first grouping able to access a different memory block of a first group of memory blocks and each group of the second grouping able to access a different memory block of a second group of memory blocks. This arrangement, which provides a full mesh, may allow for more efficient communication between a larger number of processors. The operation of this arrangement will be described in more detail with reference to FIGS. 6 and 7.

Figure 6:
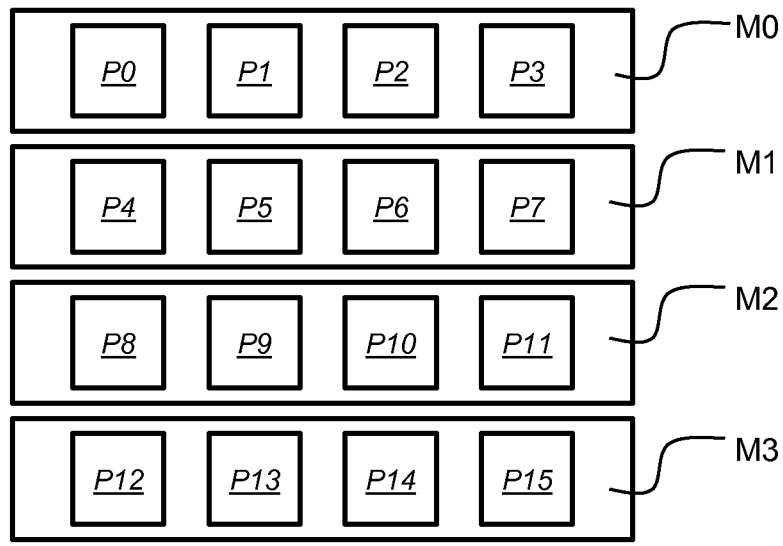
FIG. 6 is a diagrammatic representation of several groups of processors, each group able to access a different memory block of a first group of memory blocks.

Turning to FIG. 6, this figure shows a diagrammatic representation of several groups of processors, each group able to access a different memory block of a first group of memory blocks ("horizontal time-slicing"). In particular, processors P0 . . . P3 are able to access memory block M0; processors P4 . . . P7 are able to access memory block M1; processors P8 . . . P11 are able to access memory block M2, and processors P12 . . . P15 are able to access memory block M3. However, if the arrangement is solely as shown in FIG. 6, no communication, either direct or indirect, is possibly between many of the processors (for example, processor P0 is in communication with neither P4 nor P5, although it is in communication with processor P1). Now turning to FIG. 7, this shows a diagrammatic representation of the processors of FIG. 6 differently grouped, each group able to access a different memory block of a second group of memory blocks ("vertical time-slicing"). That is to say, processors, P0, P4, P8 and P12 are able to access memory block M4; similarly, processors, P1, P5, P9 and P13 are able to access memory block M5, and processors, P2, P6, P10 and P14 are able to access memory block M6 processors, P3, P7, P11 and P15 are able to access memory block M7. Similarly to the described above, if the arrangement is solely as shown in FIG. 7, no communication, either direct or indirect, is possibly between many of the processors (for example, processor P0 is in communication with neither P1 nor P5, although it is communication with processor P4).

Figure 7:
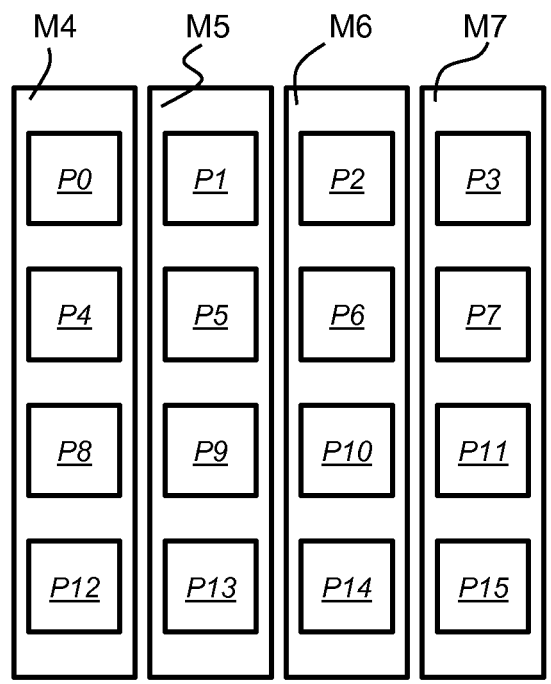
FIG. 7 is a diagrammatic representation of the processors of FIG. 5 differently grouped, each group able to access a different memory block of a second group of memory blocks.

The arrangement shown in FIG. 5 is a combination of the horizontal-time-slicing shown in FIG. 6, and vertical time-slicing as shown in FIG. 7. A first result of the combination is that each processor is in direct communication with a larger number of processors, than would be available by just the arrangement of FIG. 6 or FIG. 7. (In the example shown, each processor can communicate directly with six other processors, rather than just three as for "one-dimensional" time-sliced arrangements of FIG. 6 or FIG. 7. A second result is that each processor is in indirect communication with all the other processors. For example, in the arrangement shown, processor P0 is in indirect communication with processor P5, in fact by two possible routes; for instance, for P0 to transfer data from P0 to P5, either: P0 writes to M4, P4 reads the data and writes it to M1 and then it is read by P5; or P0 writes to M0, P1 reads the data and writes it to M5 and then it is read by P5. Thus, in the arrangement of FIG. 5, P0 can communicate with all of processors P1, P4 and P5—with processor P1 and P4 directly, and with processor P5 indirectly.

Figure 8:
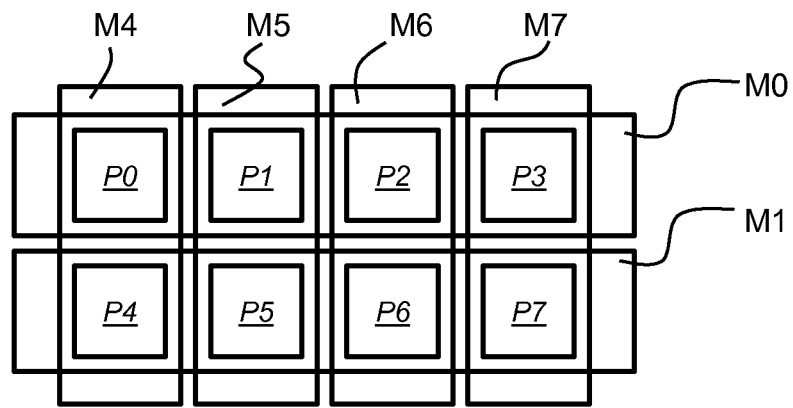
FIG. 8 is a diagrammatic representation of a multiprocessor arrangement having a different number of processors than that shown in FIG. 6.

FIG. 8 is a diagrammatic representation of a multiprocessor arrangement having a different number of processors than that shown in FIG. 6. This arrangement is a full-mesh arrangement for communication between eight processors—arranged such that 4, that is, processors P0 . . . P3, can access a first time-sliced memory block M0, and the other 4, that is, processors P4 . . . P7, can access another time-sliced memory block M1. This provides so-called horizontal time-slicing. A so-called vertical time-slicing is also provided such that pairs of processors, P0 and P4, P1 and P5, P2 and P6, and P3 and P7 can accessible memory blocks M4, M5, M6 and M7 respectively. From this figure, it can be seen that symmetry is not required between the number of processor which have time-sliced access to different memory banks.

Figure 9:
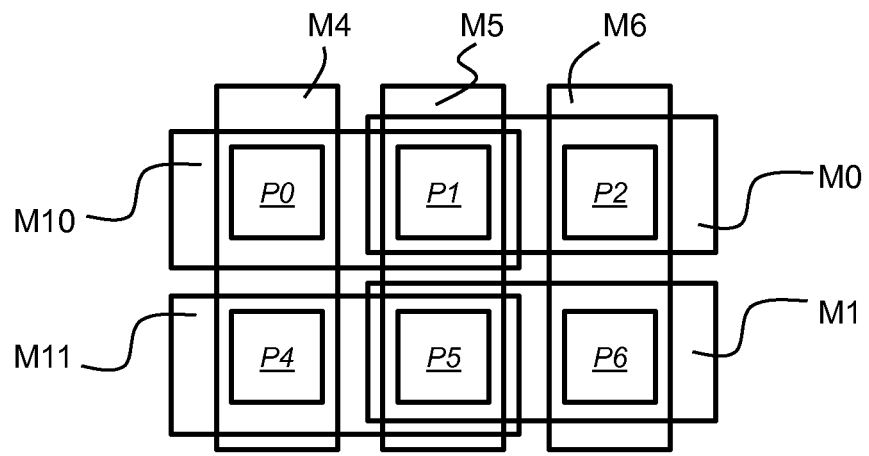
FIG. 9 is a diagrammatic representation of a further multiprocessor arrangement in which some of the processors can access a third memory block.

FIG. 9 is a diagrammatic representation of a further multiprocessor arrangement in which some of the processors can access a third memory block. This figure illustrates other embodiments, in which there is so-called "three-dimensional" time slicing. By analogy to the so-called "two-dimensional" time-slicing in which processors share both "vertical" and "horizontal" memory blocks, in three-dimensional time-slicing, at least some of the processors can access a third memory block. In the figure, the "vertically time-sliced memories M4, M5 and M6 can be accessed by processor P0 and P4, P1 and P5, and P2 and P6 respectively. P1 can communicate with P0, and P5 with P4 by means of time sliced memories M10 and M11 respectively. The skilled person will appreciate that in further embodiments, a processor may be able to access even more memories. The skilled person will also appreciate that, by use of three-dimensional (or higher-dimensional) time-slicing, an arbitrary and effectively unlimited number of processors may be able to communicate with each other. Further, it will also be appreciated, that by "daisychaining" memory blocks, an arbitrary and effectively unlimited number of processor may be able to communicate with each other, albeit possibly requiring several hops between other processors as intermediate nodes.

In embodiments, one or more of the processors may include a routing table. A routing table may hold information as to which memory block the processor should write data to, for direct communication with a specific other processor; a routing table may alternatively or in addition hold information as to which memory block to write to, and which other processor should be used as an intermediate node, for transferring data to and from a remote processor which is not in direct communication with the processor. The routing table may be specific to the processor, or may hold the complete routing information for the entire mesh. The routing table may be propagated from one processors to one or more, or even all, the other processors. It will be immediately apparent to the skilled person how to construct such a routing table, and what form it may take.

In some embodiments, the memories and processors are connected during the design stage. In other embodiments, dynamic connection may be used; however, this would generally incur a cost in terms of additional hardware required to provide the temporary or configurable connections. The arrangement will generally be on a single integrated circuit chip, although links to one or more further chip or chips, with a distributed arrangement can also be envisioned.

In embodiments, the memory blocks forming the so-called "horizontal" grouping are parts, and may be partitions, of a single memory. Similarly, in embodiments, the memory blocks forming the so-called "vertical" grouping are parts, and may be partitions, of a single memory. In some embodiments, all the memory blocks are part of or are partitions of a single memory.

Although embodiments above have been described with reference to "horizontal" and "vertical" groupings and orthogonal arrangements, the skilled person will appreciate that the invention is not so limited; other configurations, such as, without limitation, a chain or ring in which groupings forming segments, which overlap, or a star configuration in which a plurality of groupings overlap at one or more central nodes, are also possible.

Seen from one viewpoint, then, herein there is disclosed a multiprocessor arrangement is disclosed, in which a plurality of processors are able to communicate with each other by means of a plurality of time-sliced memory blocks. At least one, and up to all, of the processors may be able to access more than one time-sliced memories. A mesh arrangement of such processors and memories is disclosed, which may be a partial of complete mesh. The mesh may to two-dimensional, or higher dimensional. A method of communication between processors in a multiprocessor arrangement is also disclosed, in which one or more processors are able to each access a plurality of memories, in each case by time-slicing.

From reading the present disclosure, other variations and modifications will be apparent to the skilled person. Such variations and modifications may involve equivalent and other features which are already known in the art of multi-processors, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A multiprocessor arrangement for communication between a plurality of processors, comprising:
    a plurality of processor circuits, each configured and arranged to access memory using a processor logic clock having a processor logic clock rate,
    a first memory block comprising a first port configured and arranged to provide access to the first memory block at a first memory clock rate that is faster than the processor logic clock rate, and
    a second memory block comprising a second port configured and arranged to provide access to the second memory block at a second memory clock rate that is faster than the processor logic clock rate,
    wherein
    a first group of processor circuits of the plurality of the processor circuits that are configured and arranged to stagger respective processor logic clocks to each sequentially access the first memory block using the first port and during a single clock cycle of the processor logic clock, and
    a second group of processor circuits of the plurality of the processor circuits that includes a processor circuit from the first group of processor circuits and wherein the processor circuits in the second group of processor circuits are configured and arranged to stagger respective processor logic clocks to each sequentially access the second memory block using the second port and during a single clock cycle of the processor logic clock.

2. A multiprocessor arrangement as claimed in claim 1, wherein at least one of the processor circuit that is included in both the first group of processor circuits and the second group of processor circuits is configured and arranged to provide shared memory access between the first memory block and the second memory block for other processor circuits in the plurality of processor circuits.

3. A multiprocessor arrangement as claimed in claim 1, wherein each of the plurality of processor circuits is configured and arranged to access two different memory blocks, each memory block having a different set of processor circuits that are configured to access the respective memory block by staggering respective processor logic clocks.

4. A multiprocessor arrangement as claimed in claim 1, wherein each of the first memory clock rate and the second memory clock rate exceeds the processor logic clock rate by a factor which is at least equal to the number of processors configured and arranged to stagger respective processor logic clocks for the respective memory block.

5. A multiprocessor arrangement as claimed in claim 1, wherein at least one of the first memory clock rate and the second memory clock rate is four times that of the processor logic clock rate.

6. A multiprocessor arrangement as claimed in claim 1, wherein the first memory block and the second memory blocks comprise partitions of a single memory.

7. A multiprocessor arrangement as claimed in claim 1, wherein at least one processor circuit of the plurality of processor circuits is also configured and arranged to access a one of a third group of memory blocks.

8. A method of communication between processor circuits in a multiprocessor arrangement which comprises a first group of memory blocks and a second group of memory blocks, the method comprising:
    providing access for each processor circuit of a first plurality of processor circuits to one memory block of the first group of memory blocks that operates at a first memory clock rate that is faster than a clock rate for a processor logic clock of the first plurality of processor circuits, by time-slicing access, in a single clock cycle of the processor logic clock of the first plurality of processor circuits, to a first port of the one memory block of the first group of memory blocks using staggered clocks of the first plurality of processor circuits; and
    providing access for each processor circuit of a second plurality of processor circuits to one memory block of the second group of memory blocks that operates at a second memory clock rate that is faster than a clock rate for a processor logic clock of the second plurality of processor circuits, by time-slicing access, in a single clock cycle of the processor logic clock of the second plurality of processor circuits, to a second port of the one memory block of the second group of memory blocks using staggered clocks of the second plurality of processor circuits; wherein the first plurality of processor circuits has at least one processor circuit in common with the second plurality of processor circuits and at least one processor circuit not in common with the second plurality of processor circuits.

9. A method as claimed in claim 8, the method further comprising a first one of the first plurality of processor circuits writing data to the one memory block of the first group of memory blocks, and a second one of the first plurality of processor circuits reading the data from the one memory block of the first group of memory blocks.

10. A method as claimed in claim 9, wherein the first processor circuit comprises a routing table for storing information indicative of which memory block of either the first or the second group of memory blocks is accessible by a specific second processor.

11. A method as claimed in claim 9, the method further comprising a first one of the second plurality of processor circuits writing data to the one memory block of the second group of memory blocks, and a second one of the second plurality of processor circuits reading the data from the one memory block of the first group or the second group of memory blocks, wherein the first one of the first plurality of processor circuits is also the first one of the second plurality of processor circuits.

12. A multiprocessor arrangement as claimed in claim 1, wherein a first processor circuit is configured and arranged to access the first memory block and a second processor circuit is configured and arranged to access the second memory block.

13. A multiprocessor arrangement as claimed in claim 1, wherein each processor circuit is configured and arranged to access a different combination of memory blocks.

14. A multiprocessor arrangement as claimed in claim 1, wherein a first set of processor circuits is configured and arranged to access a given memory block, and a second, different, set of processors is configured and arranged to access another memory block.

15. A multiprocessor arrangement as claimed in claim 14, wherein the first set and second set of processor circuits are configured and arranged to communicate with one another indirectly through a processor circuit configured to access both the given memory block and the another memory block.

* * * * *